United States Patent
Gobbers et al.

[11] Patent Number: 6,158,809
[45] Date of Patent: Dec. 12, 2000

[54] SEAT MECHANISM FOR MOUNTING IN A SHOWER OR BATHTUB

[76] Inventors: Dieter Gobbers; Walters Gobbers, both of P.O.Box 1537, Lehigh Acres, Fla. 33970

[21] Appl. No.: 09/300,776

[22] Filed: Apr. 27, 1999

[30] Foreign Application Priority Data

Apr. 27, 1998 [DE] Germany ............... 198 18 821

[51] Int. Cl.$^7$ .................................................. A47C 1/02
[52] U.S. Cl. ................... 297/344.17; 297/344.2; 297/339; 4/578.1; 4/565.1; 248/405
[58] Field of Search ................. 297/344.12, 344.17, 297/344.19, 344.2, 338, 339; 4/578.1, 565.1; 248/405

[56] References Cited

U.S. PATENT DOCUMENTS

| | | |
|---|---|---|
| 1,585,291 | 5/1926 | Jordan . |
| 1,927,598 | 9/1933 | Schlichter . |
| 3,103,384 | 9/1963 | Zivi . |
| 4,013,316 | 3/1977 | Cropper ............... 297/344.19 |
| 4,786,032 | 11/1988 | Garman et al. . |
| 5,282,593 | 2/1994 | Fast ............... 248/405 |
| 5,297,849 | 3/1994 | Chancellor ............... 297/344.12 |
| 5,335,377 | 8/1994 | Masyada et al. ............... 4/578.1 |

FOREIGN PATENT DOCUMENTS

| | | |
|---|---|---|
| 368750 | 3/1932 | Austria . |
| 0 067 069 | 12/1982 | European Pat. Off. . |
| 0 594 378 | 4/1994 | European Pat. Off. . |
| 0 687 455 | 12/1995 | European Pat. Off. . |
| 44 37 515 | 4/1996 | Germany . |
| WO 88/07848 | 10/1988 | WIPO . |

*Primary Examiner*—Anthony D. Barfield
*Attorney, Agent, or Firm*—Ohlandt, Greeley, Ruggerio & Perle, L. L. P.

[57] ABSTRACT

A seat mechanism for mounting in a shower or bathtub has a telescoping lift column that raises and lowers the seat. The column has mutually interacting elements that have two end elements and at least one middle element between them. The at least one middle element and at least a first of the end elements have external threads. The at least one middle element and a second of the end elements have internal threads. A drive is arranged to rotate one of the two end elements.

2 Claims, 5 Drawing Sheets

SEAT MECHANISM FOR MOUNTING IN A SHOWER OR BATHTUB

BACKGROUND OF THE INVENTION

1. Field of the Invention

This invention relates to a mechanism for mounting in a bathtub or the like as an aid when climbing in or out.

Such mechanisms are helpful or indispensable for elderly or infirm persons. They make it possible and convenient to climb into and out of a bathtub or the like.

2. Description of the Prior Art

The basic structure in every case has a seat panel. The seat panel is usually supported by a folding frame whose folding members are adjustable and thus bring about a change in the height of the seat panel. It can be driven by an electric motor or pneumatically, or by using the water pressure of the domestic water supply.

Such a mechanism has been disclosed by German Pat. No. DE 44 37 515 A1. In that case a lift mechanism in the form of a telescoping column grips the seat. It has a number of telescoping cylinders that can move in and out. The bottom of the telescoping column is supported, directly or indirectly, on the bottom of the tub, and the top is supported on the seat.

In all mechanisms and devices that are intended for the handicapped, the primary question is of reliability in use. Thus, in the embodiment with the mentioned telescoping column, the height cannot be changed in any case at all once it is set without the user wanting to do so. The user should be able to adjust the height positively, reliably, and permanently to any desired level.

This requirement is not met in the known embodiment with the mentioned telescoping column. This is the case particularly when the drive for extending and retracting the column is pneumatic or hydraulic. Specifically, the load on the seat can lead to the seat being lowered jerkily.

SUMMARY OF THE INVENTION

The underlying task of this invention is to design a seat mechanism of the kind mentioned so that the seat can be raised and lowered steplessly, and so that the height will remain unchanged once it is set regardless of the load on the seat.

BRIEF DESCRIPTION OF THE DRAWINGS

The invention will be described in detail with reference to the drawing. The drawings in detail show the following.

DESCRIPTION OF THE INVENTION

Figure 1:
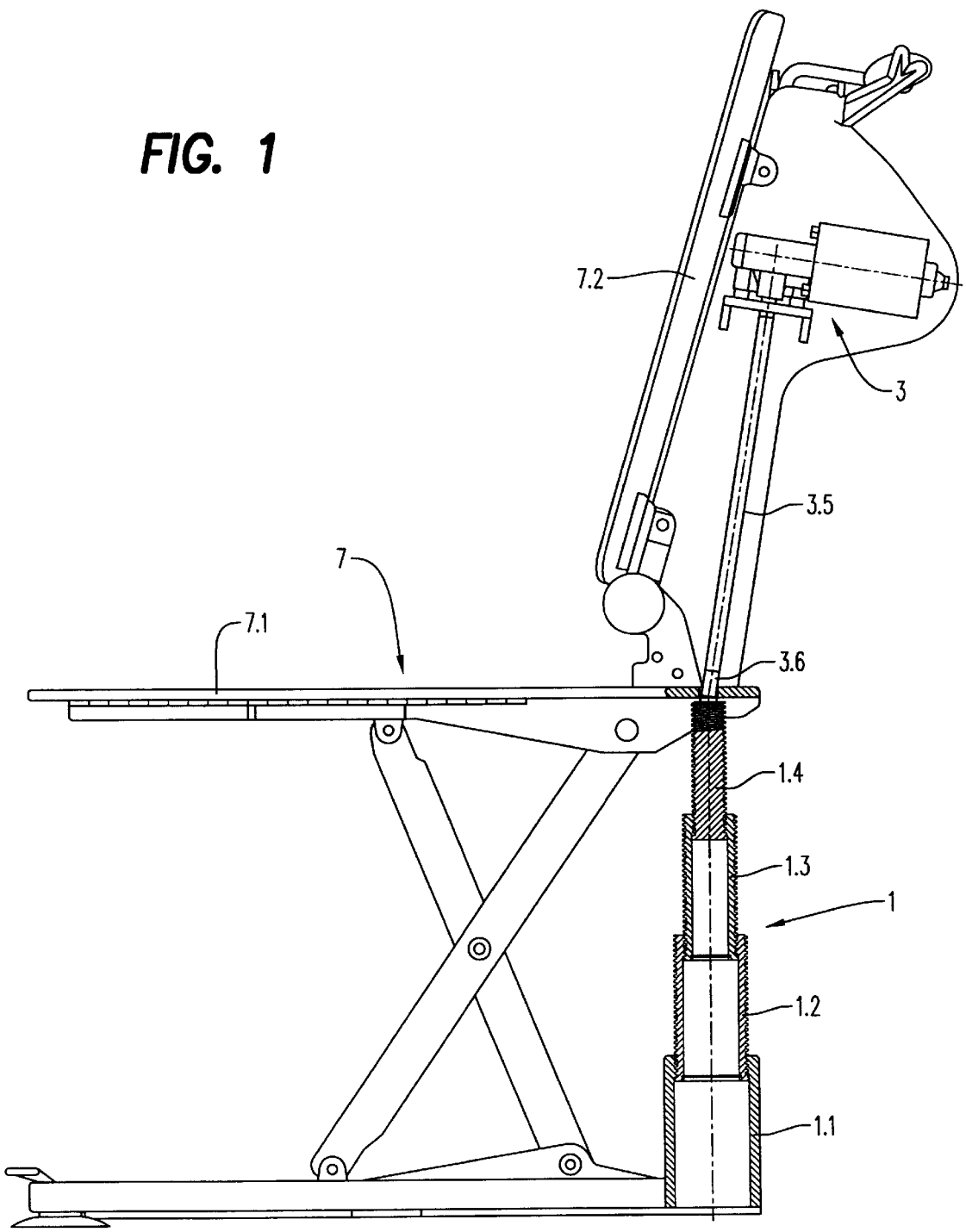
FIG. 1 shows a chair usable in a bathtub, with a seat that can be raised and lowered.

In the embodiment of FIG. 1, a chair 7 can be seen It is a chair that is called a "bathlift" in the rehab sector and is mounted in a bathtub or the like, so that it can be used by handicapped or elderly people as an aid when climbing in and out. This bathlift has a seat 7.1 and a backrest 7.2. The seat can be moved up and down by means of a column 1 according to the invention. A drive 3 transmits a torque to the uppermost element 1.4 of the column through a shaft 3.5 with a universal joint 3.6.

The column 1 has other elements, namely the elements 1.1, 1.2, 1.3. It can be seen that the seat 7.1 rests on a folding frame.

Figure 2:
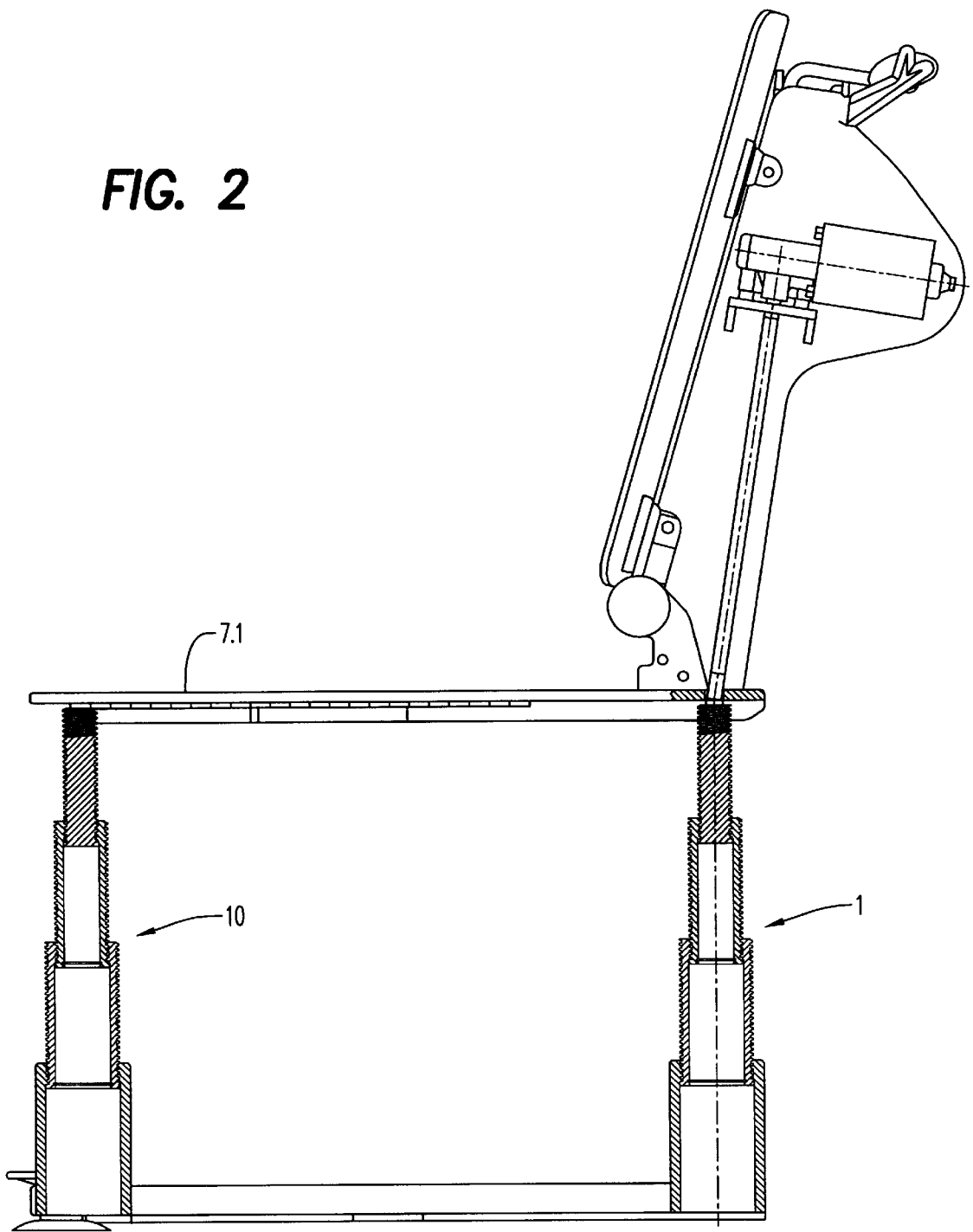
FIG. 2 shows an alternative embodiment of the object of FIG. 1.

The embodiment of FIG. 2 differs from that of FIG. 1 in the following way: It has no folding frame. Instead, the seat 7.1 rests on four telescoping columns, only columns 1 and 10 of which can be seen in this side view. All of the rest of the elements are the same as in the embodiment of FIG. 1.

Figure 3:
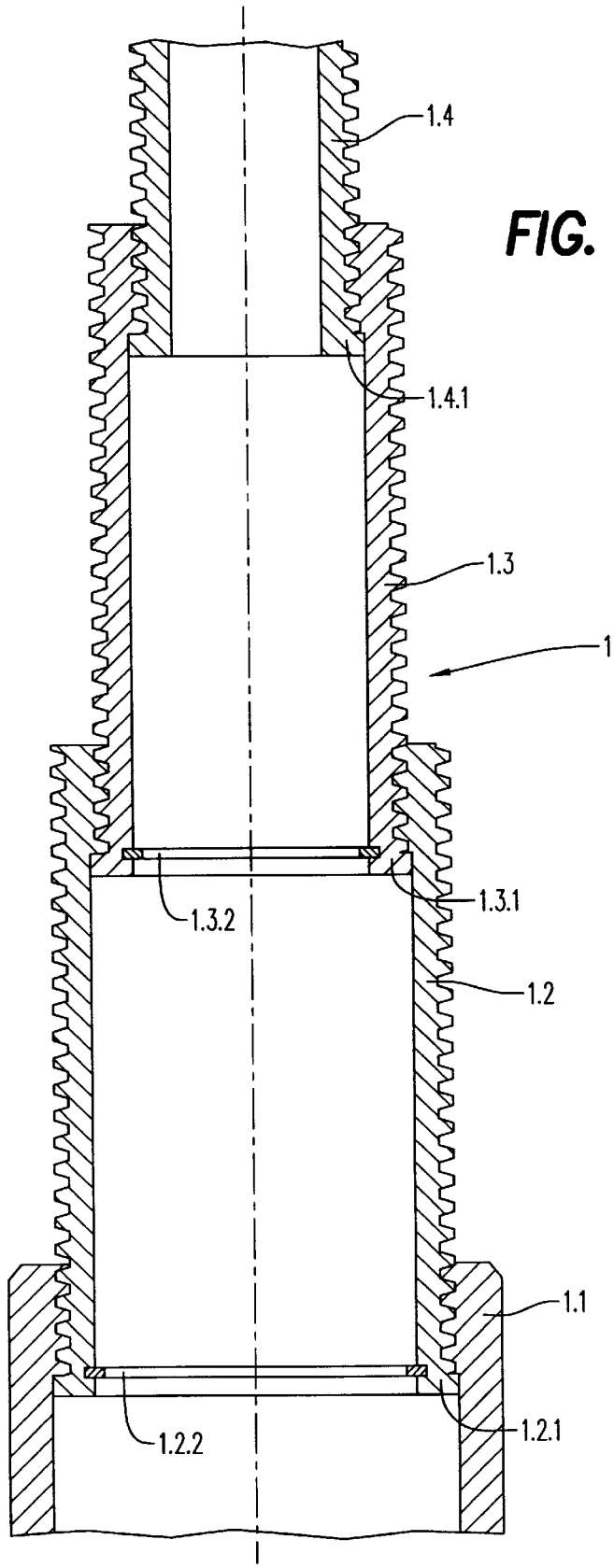
FIG. 3 illustrates a column made up of individual elements, in the extended state.

The column 1 shown in FIG. 3 is made up of several cylindrical elements 1.1 to 1.4. It can be seen that the elements 1.2, 1.3, and 1.4 have external threads. The elements 1.1, 1.2, and 1.3 also have internal threads inside at the top end. All of the threads in the present case are trapezoidal threads. However, other thread profiles can also be provided, for example round threads.

The power transmission device shown here is illustrated in the extended state.

Element 1.2 has a collar 1.2.1 at its base. Element 1.3 has a collar 1.3.1 at its base. Element 1.4 has a collar 1.4.1 at its base. These collars serve as stops and prevent the complete extension of the element in question out of the element below it. They also serve as guides and to absorb bending forces.

The elements 1.2 and 1.3, again in the base area, are provided with a locking ring 1.2.2 and 1.3.2, respectively. These locking rings likewise serve as stops when the individual elements are retracted into one another, so that an element cannot "pass through" the one below it. Thus, for example, collar 1.3.1 bumps into the locking ring 1.2.2 of element 1.2 when element 1.3 is screwed downward.

Figure 4:
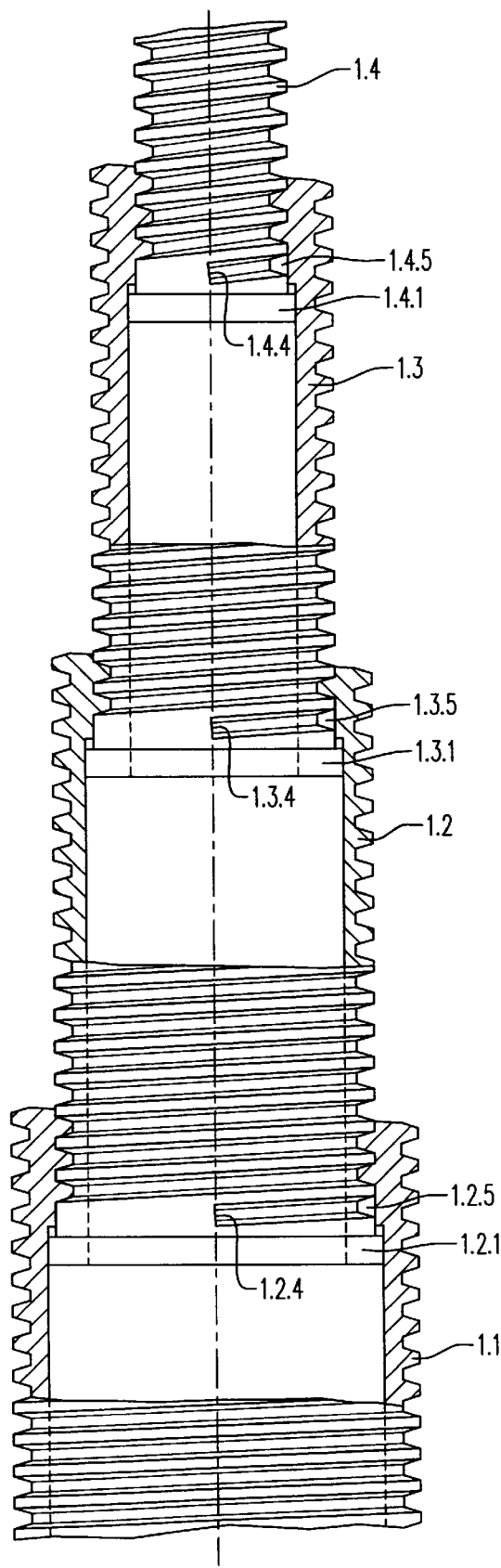
FIGS. 4 to 7 show details of the individual elements.

FIG. 4 in turn shows a column made up of individual elements in the extended state. The collars 1.2.1, 1.3.1, and 1.4.1 that are seen also in FIG. 2 can be seen here.

The internal and external threads of the individual elements 1.1, 1.2, 1.3, and 1.4 are again trapezoidal threads.

The novelty lies in the following:

The threading of each element ends suddenly at its bottom; in other words without gradually disappearing. The thread groove thus ends with a surface 1.2.4, 1.3.4, 1.4.4 essentially perpendicular to the axis. A bumper surface 1.2.5, 1.3.5, 1.4.5 of the associated thread rib corresponds to each thread groove. This provides stops that prevent further turning in the direction of withdrawal of the individual elements out of one another.

Figure 5:
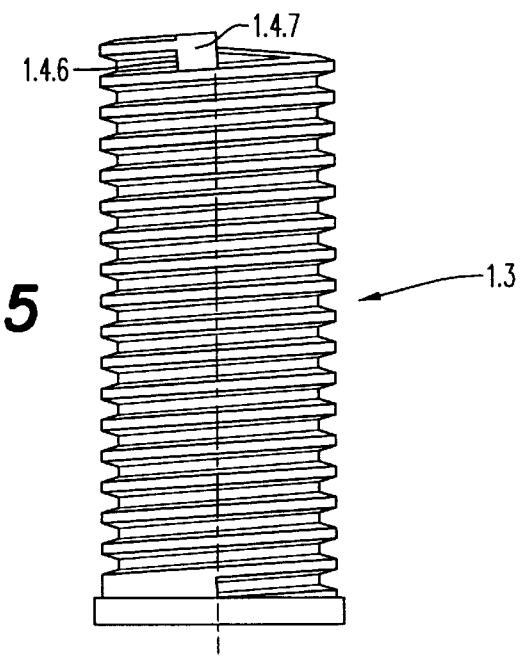
Figure 6:
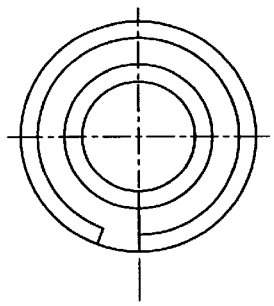
Figure 7:
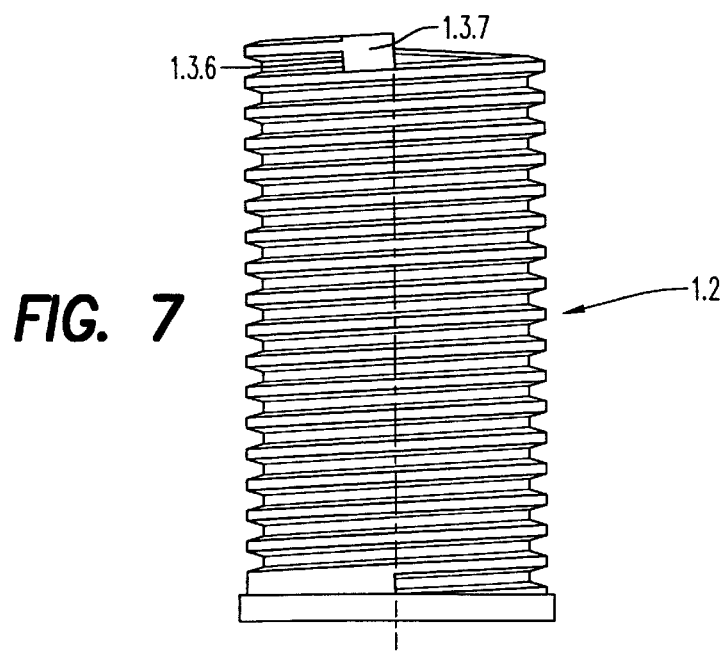

FIG. 5 again shows element 1.3, FIG. 6 shows element 1.2, and FIG. 7 shows the two elements in top view.

It can be seen that the threads in the upper area are shaped similarly to those in the lower area. Thus, the last turn of the thread in element 1.3 stops suddenly with a bumper surface 1.4.6, without gradually running out. In element 1.2, the bumper surface 1.3.6 can be seen. The bumper surfaces are formed by barrier parts 1.4.7 and 1.3.7, respectively, which are independent components and that are firmly connected to the particular element by screws, for example.

An advantage of this form of embodiment is the fact that the locking rings that are shown in FIG. 3 can be omitted— see the locking rings 1.2.2 and 1.3.2 there.

What is claimed is:

1. A seat mechanism for mounting in a shower or a bathtub, said seat mechanism comprising:

a seat; and a telescoping lifting column that grips said seat and is adapted to raise and lower said seat, wherein said telescoping lifting column has a plurality of mutually interacting elements, said plurality of elements having two end elements and at least one central element therebetween, said at least one central element and a first one of said two end elements having external threads, said at least one central element and a second one of said two end elements having internal threads, wherein said first and second end elements have a longitudinal axis, and a drive arranged to rotate one of said first and second end elements about said longitudinal axis in either direction.

2. A seat mechanism according to claim 1, further comprising a plurality of stops, one of said stops being disposed to prevent a complete excursion of one of said plurality of elements out of an adjacent one of said plurality of elements, and wherein said one stop provides longitudinal guidance and absorbency of bending forces that may occur.

* * * * *